(12) United States Patent
Shoji

(10) Patent No.: US 7,019,948 B2
(45) Date of Patent: Mar. 28, 2006

(54) THIN FILM MAGNETIC HEAD, MAGNETIC HEAD DEVICE AND MAGNETIC RECORDING/REPRODUCING DEVICE

(75) Inventor: Shigeru Shoji, Tokyo (JP)

(73) Assignee: TDK Corporation, Tokyo (JP)

(*) Notice: Subject to any disclaimer, the term of this patent is extended or adjusted under 35 U.S.C. 154(b) by 342 days.

(21) Appl. No.: 10/191,502

(22) Filed: Jul. 10, 2002

(65) Prior Publication Data
US 2003/0058585 A1 Mar. 27, 2003

(30) Foreign Application Priority Data
Sep. 26, 2001 (JP) .............................. 2001-295029

(51) Int. Cl.
*G11B 5/127* (2006.01)
*G11B 5/39* (2006.01)

(52) U.S. Cl. ..................................... 360/322
(58) Field of Classification Search ................ 360/322, 360/324.12, 324.11, 324.2, 324.1
See application file for complete search history.

(56) References Cited

U.S. PATENT DOCUMENTS

| | | | | |
|---|---|---|---|---|
| 5,847,904 A | * | 12/1998 | Bharthulwar | ............... 360/322 |
| 6,570,743 B1 | * | 5/2003 | Garfunkel et al. | .......... 360/322 |
| 6,583,970 B1 | * | 6/2003 | Sakata | .................... 360/324.12 |
| 6,665,153 B1 | * | 12/2003 | Hayashi | ...................... 360/322 |
| 6,816,345 B1 | * | 11/2004 | Knapp et al. | ............... 360/322 |

FOREIGN PATENT DOCUMENTS

| | | |
|---|---|---|
| JP | 07326021 A | 12/1995 |
| JP | 08287421 A | 11/1996 |
| JP | 10049829 A | 2/1998 |
| JP | 10255237 A | 9/1998 |
| JP | 2000200404 A | 7/2000 |
| JP | 2001043512 A | 2/2001 |

* cited by examiner

*Primary Examiner*—William J Klimowicz
(74) *Attorney, Agent, or Firm*—Oliff & Berridge, PLC

(57) ABSTRACT

A thin film magnetic head has a reading element including a magnetoresistive effective film, a pair of magnetic domain-controlling films and a pair of electrode films. The magnetic domain-controlling films are provided both sides of the magnetoresistive effective film in a track width direction, respectively, so that the depth of the magnetic domain-controlling films is set equal to the depth of the magnetoresistive effective film in a depth direction perpendicular to the track width direction. The electrode films are provided on the magnetic domain-controlling films so as to have elongated portions, respectively, beyond a region where the depth of the magnetic domain-controlling films is set equal to the depth of the magnetoresistive effective film.

10 Claims, 18 Drawing Sheets

THIN FILM MAGNETIC HEAD, MAGNETIC HEAD DEVICE AND MAGNETIC RECORDING/REPRODUCING DEVICE

BACKGROUND OF THE INVENTION

1. Field of the Invention

This invention relates to a thin film magnetic head, a magnetic head device and a magnetic recording/reproducing device.

2. Related Art Statement

In a magnetic recording field, a thin film magnetic head having a spin-valve film (hereinafter, called as a "SV film") or a ferromagnetic tunnel junction film (hereinafter, called as a "TMR film") as a reading element is mainly employed for developing the recording density and the miniaturization.

In such a thin film magnetic head, the reading element includes a second ferromagnetic layer (pinned layer) of which the magnetization is fixed and a first ferromagnetic layer (free layer) of which the magnetization is rotated freely commensurate with an external magnetic field. The resistance of the reading element is minimized as the direction of the magnetization of the second ferromagnetic layer (pinned layer) is parallel to that of the first ferromagnetic layer (free layer), and is maximized as the direction of the magnetization of the second ferromagnetic layer (pinned layer) is anti-parallel to that of the first ferromagnetic layer (free layer). Therefore, a given external magnetic field is detected by measuring the change in resistance as the first ferromagnetic layer (free layer) is rotated. A perpendicular biasing magnetic field is applied to the first ferromagnetic layer (free layer) from a magnetic domain-controlling film to be made single domain, so that Barkhausen noise due to the movement of magnetic wall can be prevented.

The magnetic domain-controlling film may be made of a given antiferromagnetic film. In this case, the perpendicular biasing magnetic field is applied through the bonding with exchange interaction between the antiferromagnetic film and the ferromagnetic film (free layer). Moreover, the magnetic domain-controlling film may be made of a hard magnetic film. In this case, the perpendicular biasing magnetic field is applied from the hard magnetic film. The former biasing means is called as exchange biasing method, and the latter biasing means is called as hard magnetic biasing method.

At both edges of the magnetoresistive effective film in the track width direction are connected a pair of electrode films to flow a sense current therein.

In the above-mentioned conventional thin film magnetic head, normally, the magnetoresistive effective film, the magnetic domain-controlling film and the electrode films are etched and formed by means of ion milling or another dry etching at the same time. Therefore, the depths of the magnetoresistive effective film, the magnetic domain-controlling film and the electrode films are set to almost the same value, as viewed from the direction perpendicular to the track width direction.

If the depth the magnetic domain-controlling film is set to the depth of the magnetoresistive effective film, the perpendicular biasing magnetic field can be uniformly applied to the magnetoresistive effective film to prevent the Barkhausen noise effectively, so that the signal-to-noise ratio (S/N ratio) can be enhanced.

In the above case, however, the sense current is concentrated at the boundaries between the electrode films and the magnetoresistive effective film, so that the electric resistance is increased, which is called as crowding resistance.

When the crowding resistance is increased, the leading resistance is also increased, so that the S/N ratio may be decreased. If the depth dimension of the thin film magnetic head is decreased with the high density recording and the reduction of the track width, the crowding resistance and thus, the leading resistance are remarkably increased, so that the S/N ratio is conspicuously decreased.

SUMMARY OF THE INVENTION

It is an object of the present invention to provide a thin film magnetic head, a magnetic head device and a magnetic recording/reproducing drive device which can exhibit large S/N ratio even though the depth dimension is reduced with the high density recording and the reduction of the track width.

In order to achieve the above object, a thin film magnetic head according to the present invention comprises a reading element including a magnetoresistive effective film, a pair of magnetic domain-controlling films and a pair of electrode films. The magnetoresistive effective film responds commensurate with an external magnetic field.

The magnetic domain-controlling films are provided both sides of the magnetoresistive effective film in a track width direction, respectively, so that the depth of the magnetic domain-controlling films is set equal to the depth of the magnetoresistive effective film in a depth direction perpendicular to the track width direction. The electrode films are provided on the magnetic domain-controlling films so as to have elongated portions, respectively, beyond a region where the depth of the magnetic domain-controlling films is set equal to the depth of the magnetoresistive effective film.

In the thin film magnetic head, as mentioned above, the reading element includes the pair of magnetic domain-controlling films which are contacted with both edges of the magnetoresistive effective film in the track width direction, respectively, so that the depth of the magnetic domain-controlling films is set almost equal to the depth of the magnetoresistive effective film in the direction perpendicular to the track width direction. Therefore, a perpendicular biasing magnetic field is uniformly applied to the magnetoresistive effective film from the magnetic domain-controlling films, so that Barkhausen noise can be repressed and thus, the S/N ratio can be enhanced.

The pair of electrode films are provided on the pair of magnetic domain-controlling film, respectively, and elongated beyond the magnetic domain-controlling films in the depth direction within the region where the depth of the magnetic domain-controlling films is set equal to the depth of the magnetoresistive effective film. With the structure of the electrode films, the concentration of current such as sense current can be prevented at the boundaries between the electrode films and the magnetoresistive effective film, and thus, the crowding resistance can be also maintained small. Therefore, the leading resistance can be also maintained small and the S/N ratio can be enhanced even in high density recording and reduction of track width.

The magnetoresistive effective film may be made of an anisotropy magnetoresistive effective film, but preferably made of a SV film for realizing a high density and small magnetic disk drive device.

This invention also relates to a magnetic head device and a magnetic recording/reproducing drive device including the above thin film magnetic head. These and other objects, features and advantages of the present invention will become more apparent upon the following detailed description and drawings.

BRIEF DESCRIPTION OF THE DRAWINGS

For a better understanding of this invention, reference is made to the attached drawings, wherein.

DETAILED DESCRIPTION OF PREFERRED EMBODIMENTS

Figure 1:
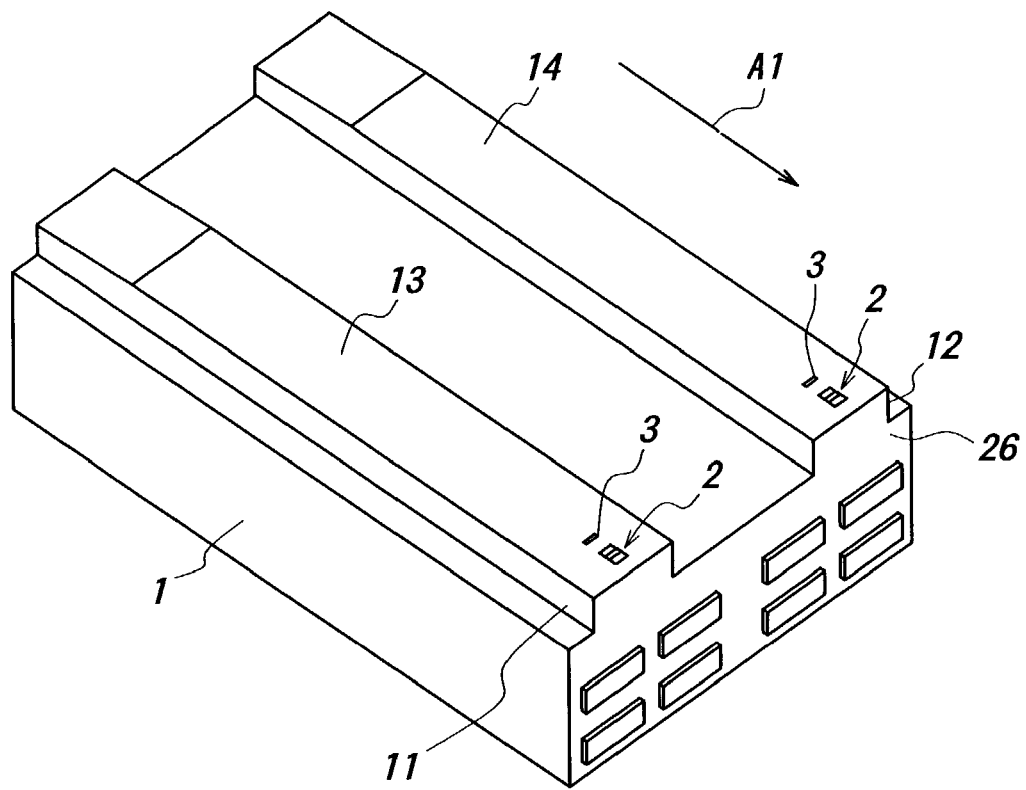
FIG. 1 is a perspective view showing a thin film magnetic head according to the present invention.
Figure 2:
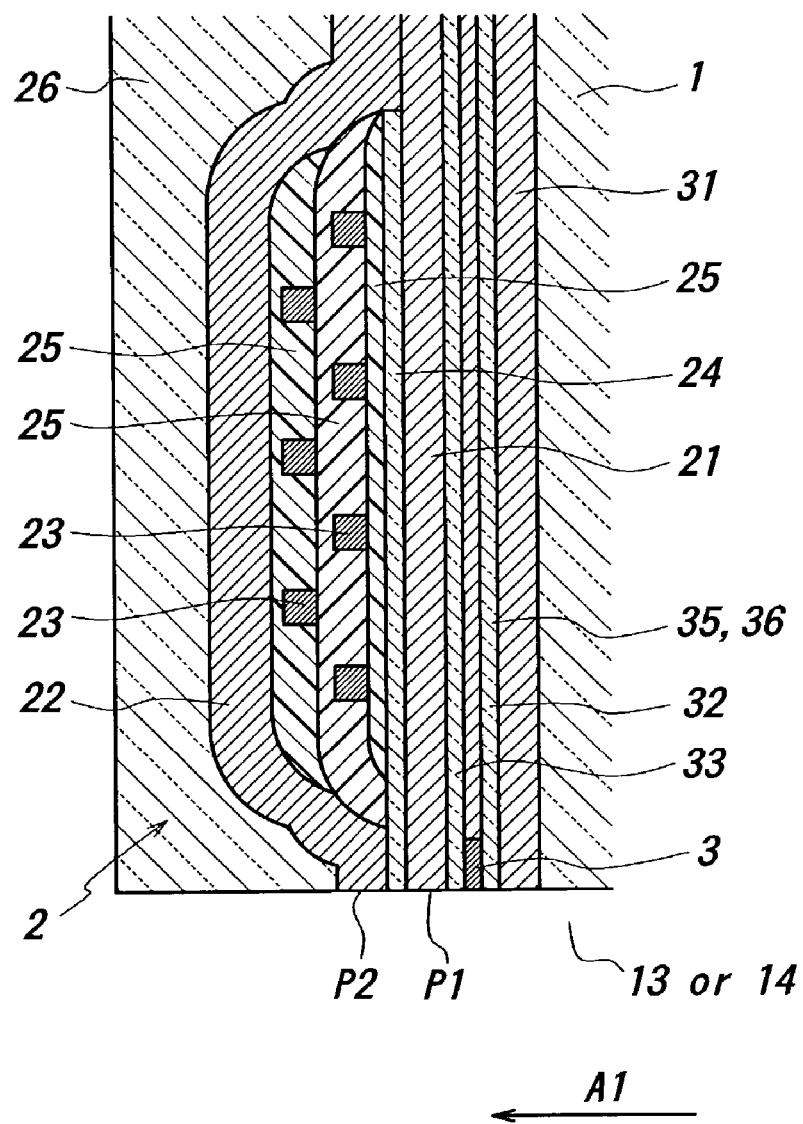
FIG. 2 is an enlarged cross sectional view showing the thin film magnetic head illustrated in FIG. 1.

This invention will be described in detail, with reference to the drawings, hereinafter. FIG. 1 is a perspective view showing a thin film magnetic head according to the present invention, and FIG. 2 is an enlarged cross sectional view showing the thin film magnetic head illustrated in FIG. 1.

In this embodiment, the thin film magnetic head includes a reading element 3 and a writing element 2 made of an inductive type MR element which are formed on a slider 1.

The slider 1 is constructed of a ceramic structural body, and composed of a base made of as $Al_2O_3$—TiC, etc., and an insulating film made of $Al_2O_3$ or $SiO_2$ formed on the base. The slider 1 has air bearing surfaces (hereinafter, called as "ABS"s) 13 and 14 which are opposed to a magnetic recording medium. In FIG. 1, the ABSs 13 and 14 are composed of rails 11 and 12 to generate a positive pressure type airflow. The ABSs 13 and 14 may be formed so as to have various geometrical shapes to generate e.g., negative pressure type airflow. This invention can be applied for any types of slider.

The writing element 2 includes a bottom magnetic film 21 doubling as a top shielding film, a top magnetic film 22, a coil film 23, a gap film 24 made of alumina or the like, an insulating film 25 and a protective film 26 which are stacked on a second gap film 33 made of alumina or the like. The forefronts of the bottom magnetic film 21 and the top magnetic film 22 constitute pole portions P1 and P2 which are opposed each other, and when a magnetic recording disk (not shown) is rotated at high speed, writing operation is carried out by utilizing the pole portions P1 and P2.

The bottom magnetic film 21 and the top magnetic film 22 are joined at a back gap portion located at the opposite side to the pole portions P1 and P2 to complete a magnetic circuit. A coil film 23 is formed on the insulating film 25 so as to whirl around the back gap portion. The depicted writing element 2 is just one embodiment, and this invention is not restricted to the writing element 2 as mentioned above.

The reading element 3 includes a magnetoresistive effective film 300, a pair of magnetic domain-controlling films 311 and 312, and a pair of electrode films 35 and 36. In this embodiment, the reading element 3 is located between the second gap film 33 and a first gap film 32. The first and the second gap films are made of alumina or the like and formed on a bottom shielding film 31 which is formed on the slider base. In this embodiment, the reading element 3 is formed under the writing element 2, but the other way round will do.

Figure 3:
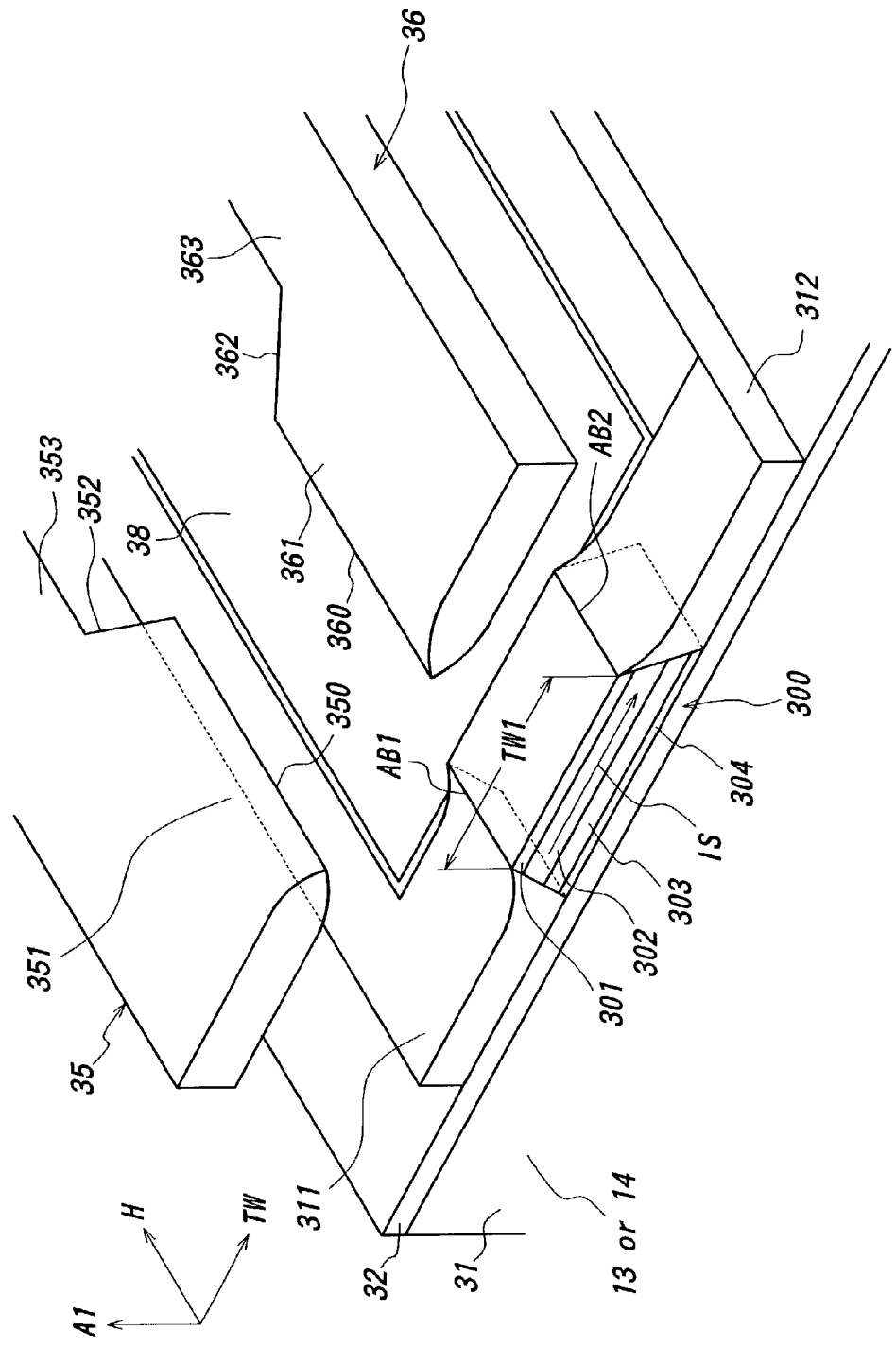
FIG. 3 is an enlarged perspective view showing the reading element of the thin film magnetic head illustrated in FIGS. 1 and 2.
Figure 4:
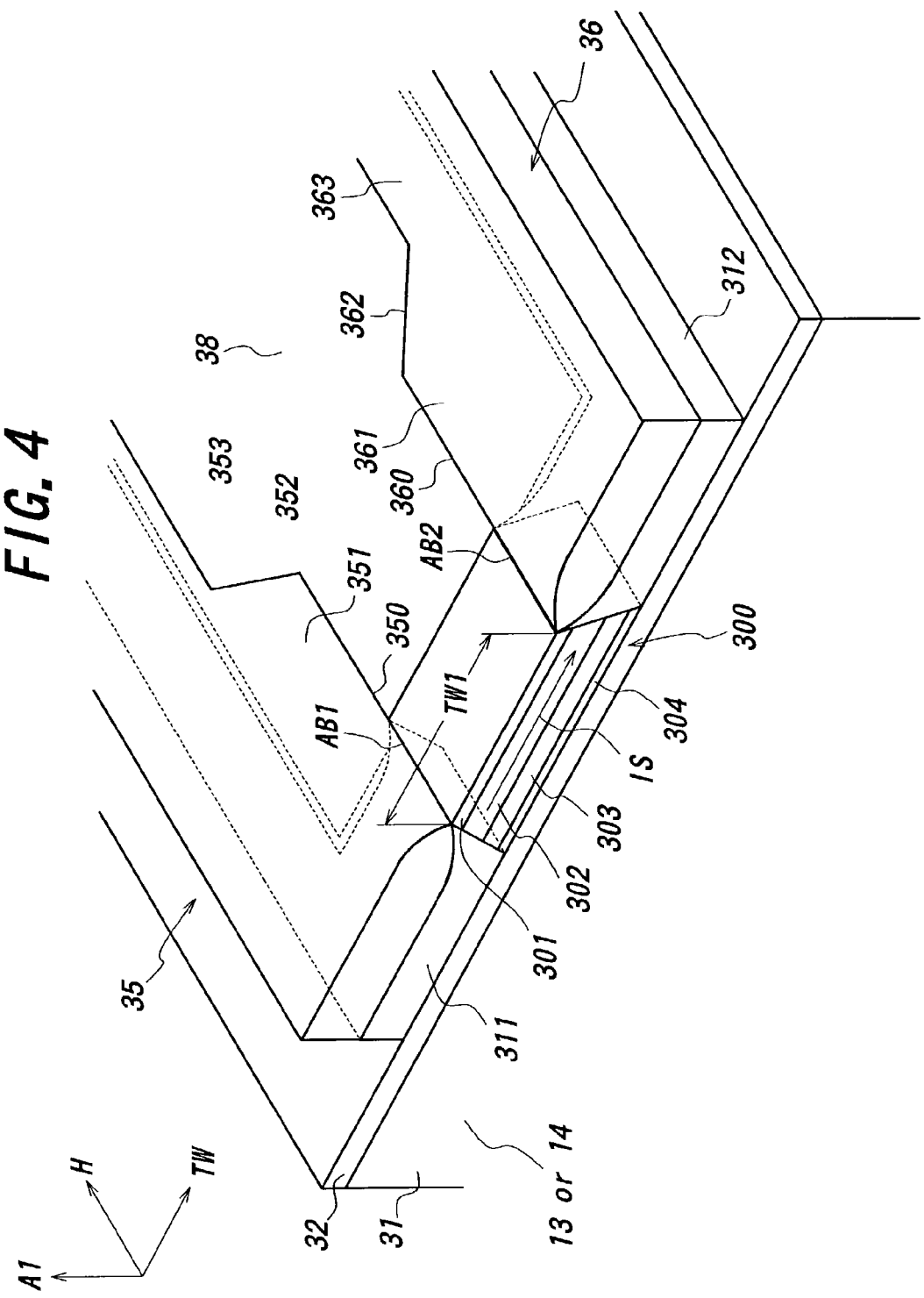
FIG. 4 is an enlarged perspective view showing the stacking state in the reading element illustrated in FIG. 3.
Figure 5:
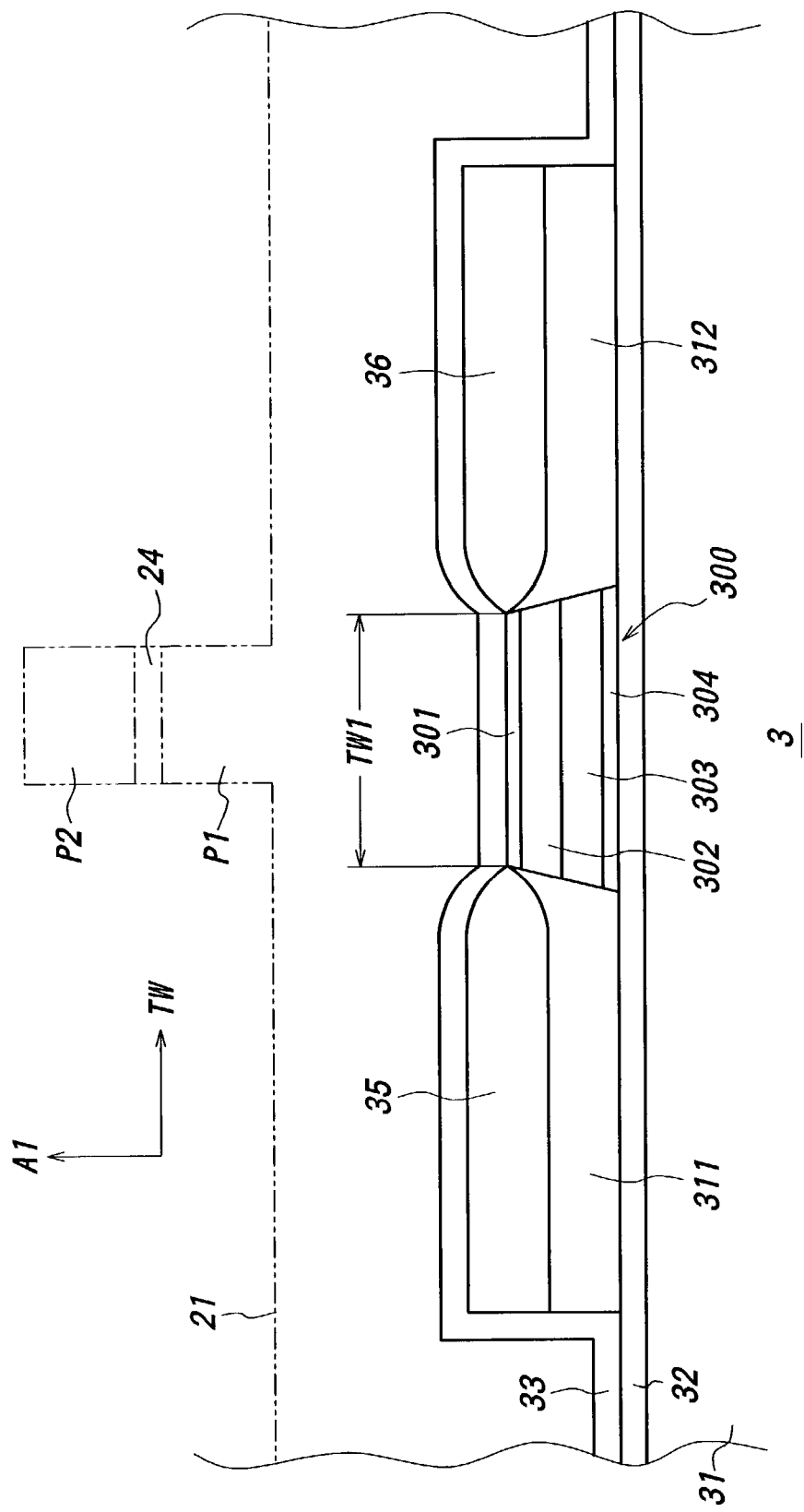
FIG. 5 is a front view of the reading element illustrated in FIGS. 3 and 4 as viewed from the air bearing surface side.

FIG. 3 is an enlarged perspective view showing the reading element of the thin film magnetic head illustrated in FIGS. 1 and 2. FIG. 4 is an enlarged perspective view showing the stacking state in the reading element illustrated in FIG. 3. FIG. 5 is a front view of the reading element illustrated in FIGS. 3 and 4 as viewed from the air bearing surface side.

The magnetoresistive effective film 300 is constructed as a response film for an external magnetic field, and thus, made of an anisotropy magnetoresistive effective film (AMR film) or a SV film. In this embodiment, the magnetoresistive effective film 300 is made of a SV film. As of now, various types of SV film are proposed in stacking structure and/or film composition, and practically used. This invention can be applied for any types of SV film.

The SV film is fundamentally composed of a first ferromagnetic layer (free layer), a non-magnetic layer, and a second, ferromagnetic layer (pinned layer) which are stacked in turn. The magnetization of the second ferromagnetic layer is fixed in one direction, and the magnetization of the first ferromagnetic layer is rotated freely commensurate with an external magnetic field. In the SV film, the resistance becomes minimum as the direction of the magnetization of the second ferromagnetic is parallel to that of the first ferromagnetic layer, and the resistance becomes maximum as the direction of the magnetization of the second ferromagnetic layer is anti-parallel to that of the first ferromagnetic layer. Therefore, the external magnetic field can be detected by measuring the resistance change.

In this embodiment, the SV film is composed of a first ferromagnetic layer 301, a non-magnetic layer 302, a second ferromagnetic layer 303 and an antiferromagnetic layer 304 which are stacked in turn. In this case, adjacent to the antiferromagnetic layer 304, the magnetization of the second ferromagnetic layer 303 is fixed in one direction.

When an external magnetic field is applied to the magnetoresistive effective film 300 made of the SV film, the magnetization of the first ferromagnetic layer 301 is rotated commensurate with the strength of the external magnetic field. The resistance of the SV film is determined on the relative angle in magnetization between the second ferromagnetic layer 303 and the first ferromagnetic layer 301. The resistance of the SV film becomes maximum as the direction of the magnetization of the first ferromagnetic layer 301 is anti-parallel to that of the second ferromagnetic layer 303, and becomes minimum as the direction of the magnetization of the first ferromagnetic layer 301 is parallel to that of the second ferromagnetic layer 303. In this case, since a sense current Is, which is flowed in the track width direction, is changed commensurate with the resistance change of the SV film, a given external magnetic field can be detected by measuring the sense current Is.

The magnetic domain-controlling films 311 and 312 are joined with both edge sides of the first ferromagnetic layer 301 in the track width direction. The magnetic domain-controlling films 311 and 312 are made of antiferromagnetic films or hard magnetic films. In this embodiment, the magnetic domain-controlling films 311 and 312 are made of hard magnetic films. A CoPt film and a CoPtCr film may be exemplified as the hard magnetic film.

The magnetic domain-controlling films 311 and 312 are contacted with both edges AB1 and AB2 of the magnetoresistive effective film 300 in the track width direction TW so that the depth of the films 311 and 312 is set equal to the depth of the film 300 in the depth direction H, and then, elongated in the track width direction TW.

A given sense current is supplied to the magnetoresistive effective film 300 via the pair of electrode films 35 and 36 which are provided so as to be adjacent to the magnetic domain-controlling films 311 and 312, respectively. The side edges of the electrode films are contacted with the both edges AB1 and AB2 of the magnetoresistive effective film 300, respectively. The track width TW1 is defined by the distance between the edges AB1 and AB2 of the magnetoresistive effective film 300, and is not restricted in this invention. Preferably, the track width TW1 is set to 0.5 μm or below.

Figure 6:
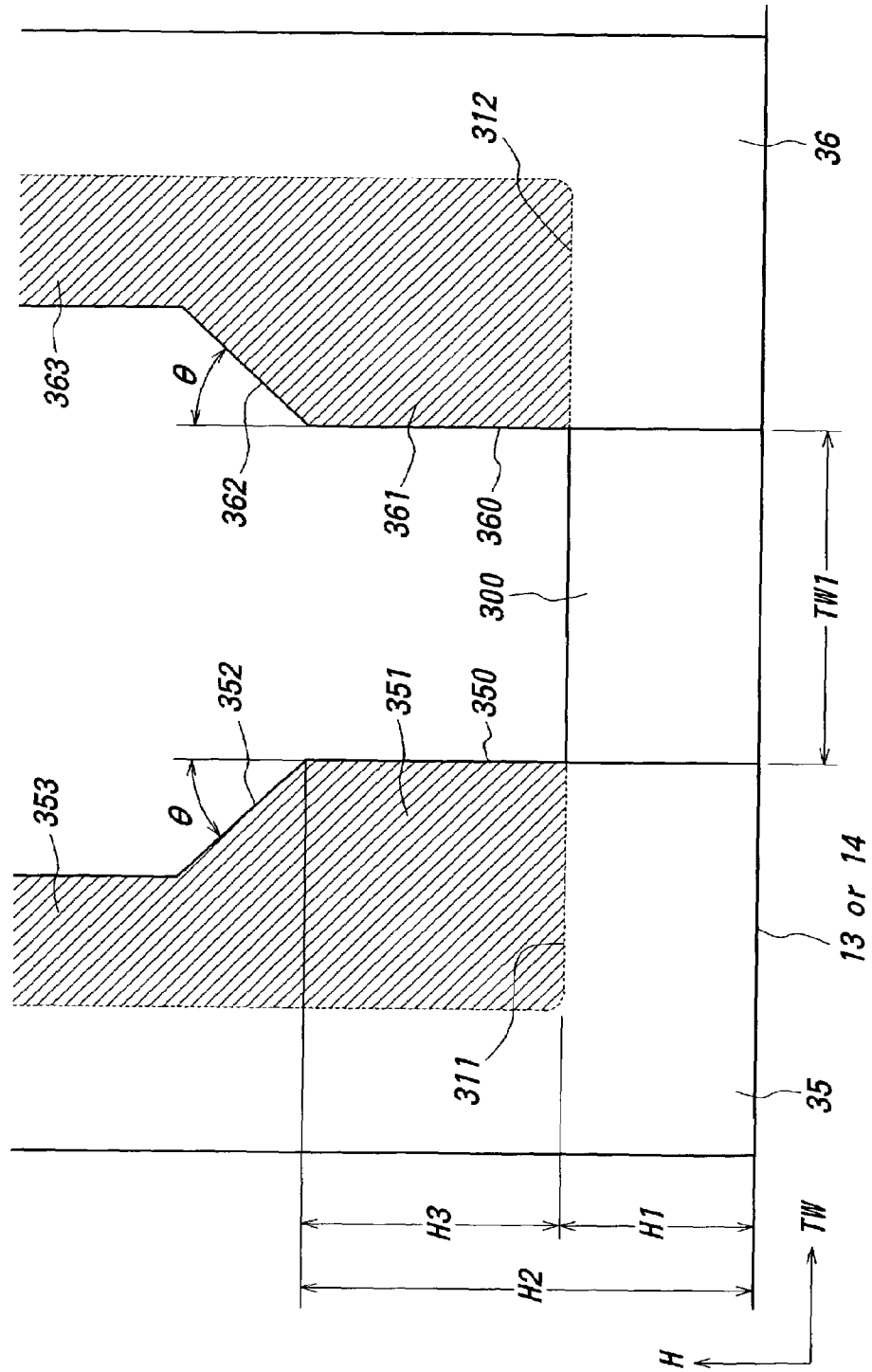
FIG. 6 is a plan view showing the relative position of the electrode films for the magnetic domain-controlling films.

FIG. 6 is a plan view showing the relative position of the electrode films 35 and 36 for the magnetic domain-controlling films 311 and 312. The electrode films 35 and 36 are elongated along the track width direction TW and beyond the region where the depth of the magnetic domain-controlling films 311 and 312 is set equal to the depth of the magnetoresistive effective film 300 in the depth direction H. Therefore, the electrode films include elongated portions 351 and 361, respectively beyond the region in the depth direction H. In FIG. 6, the elongated portions are designated by the hatched lines. The shapes of the elongated portions is not limited to the one illustrated in FIG. 6, but any shapes will do.

The elongated portions 351 and 361 are composed of side edge portions 350 and 360 which are elongated linearly along the depth direction H and inclined portions 352 and 362 which are inclined outward from the ends H2 of the side edge portions 350 and 360 at an angle of θ so that the widths of the elongated portions 351 and 361 in the track width direction TW are decreased. The inclination angle θ is preferably set within 45–60 degrees. The inclined portions 352 and 362 continue to backward portions 353 and 363 elongated in the depth direction H and having the same widths as the ends of the inclined portions 352 and 362.

In this embodiment, the reading element 3 includes a planarizing film 38. The elongated portions 351 and 361 of the electrode films 35 and 36 are on the planarizing film 38. The surface level of the planarizing film 38 is set equal to the surface level of the magnetic domain-controlling films 311 and 312, so that the electrode films 35 and 36 can be formed flat to have the same thickness entirely. The planarizing film 30 may be made of a non-magnetic insulating material such $Al_2O_3$ or $SiO_2$.

Figure 7:
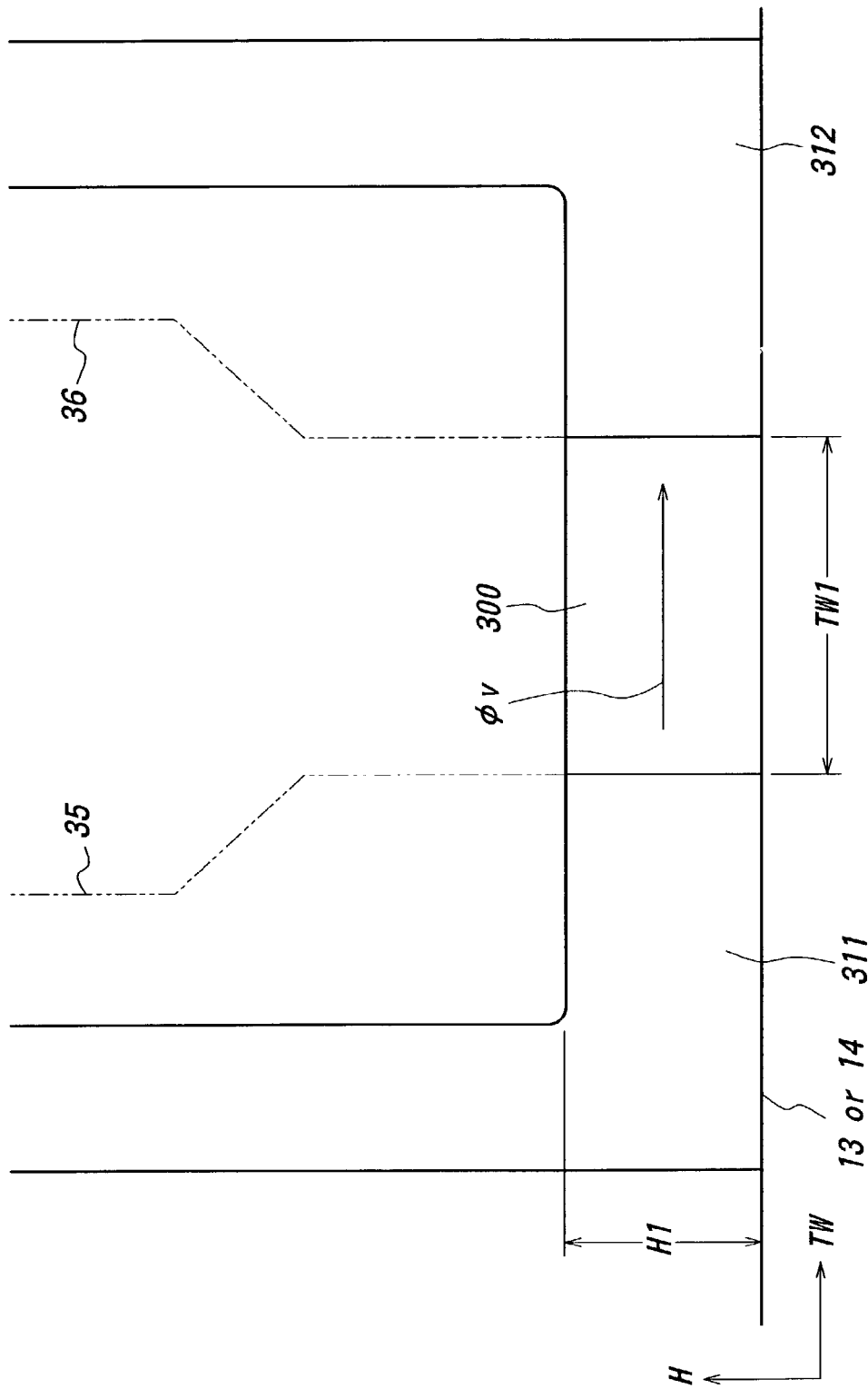
FIG. 7 is an explanatory view showing the relation between the depth of the magnetic domain-controlling film and the biasing magnetic field.

In the thin film magnetic head of the present invention, as mentioned above, the reading element 3 includes the pair of magnetic domain-controlling films 311 and 312 which are joined with both edges AB1 and AB2 of the magnetoresistive effective film 300 in the track width direction TW so that the depth of the films 311 and 312 is set equal to the depth of the film 300 in the depth direction H perpendicular to the track width direction TW. As shown in FIG. 7, therefore, a perpendicular biasing magnetic field φv is applied uniformly to the magnetoresistive effective film 300 from the magnetic domain-controlling films 311 and 312 in the track width direction TW, so that Barkhausen noise can be prevented and thus, large S/N ratio can be obtained. In contrast, if the magnetic domain-controlling films 311 and 312 are formed so as to have the same shape as the electrode films 35 and 36 designated by the broken lines, a magnetic wall may be generated easily in the first ferromagnetic layer 301 of the SV film, so that Barkhausen noise may be generated and thus, the S/N ratio may be deteriorated.

The electrode films 35 and 36 are formed on the magnetic domain-controlling films 311 and 312, respectively, and include the elongated portions 351 and 361 existing beyond the region where the depth of the magnetic domain-controlling films 311 and 312 is set equal to the depth of the magnetoresistive effective film 300 in the depth direction H.

Figure 8:
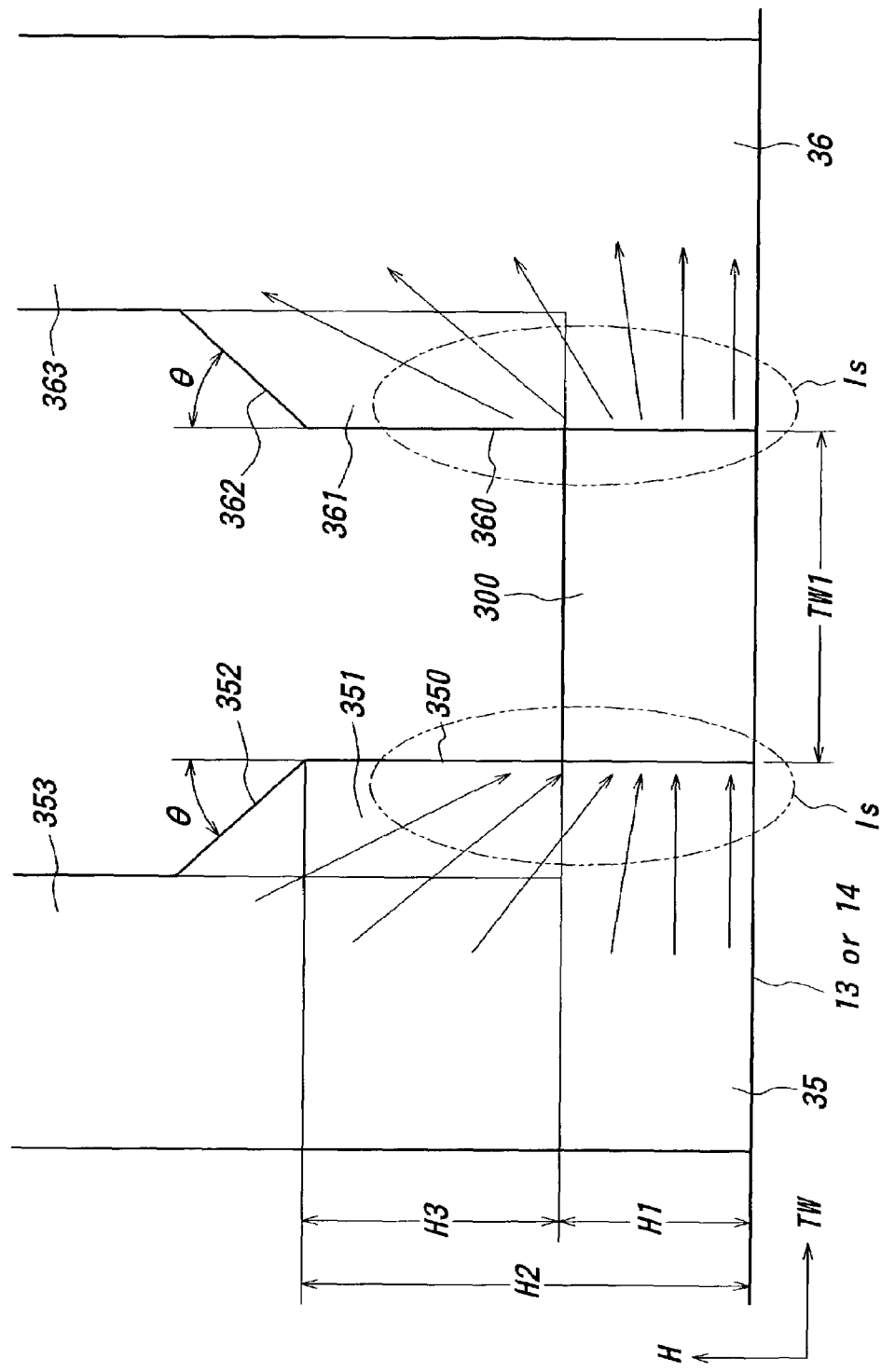
FIG. 8 is an explanatory view showing the relation between the depth of the electrode films and the sense current.

With the above structure of the electrode films, the areas of the electrode films 35 and 36 are enlarged backward from the magnetoresistive effective film 300 because of the elongated portions 351 and 361, so that the current concentration at the edges AB1 and AB2 can be prevented, as shown in FIG. 8, and the crowding resistance can be repressed. As a result, the leading resistance can be also repressed sufficiently and the S/N ratio can be enhanced even in high density recording and reduction of track width.

If the depth of the electrode films 35 and 36 is set equal to the depths H1 of the magnetoresistive effective film 300 and the magnetic domain-controlling films 311 and 312, current concentration occurs at both edges AB1 and AB2 to increase the crowding resistance.

The prevention of current concentration and the repression of claunding resistance can be exhibited effectively by setting the inclination angle θ of the inclined portions 352 and 362 to 60 degrees or below.

Figure 9:
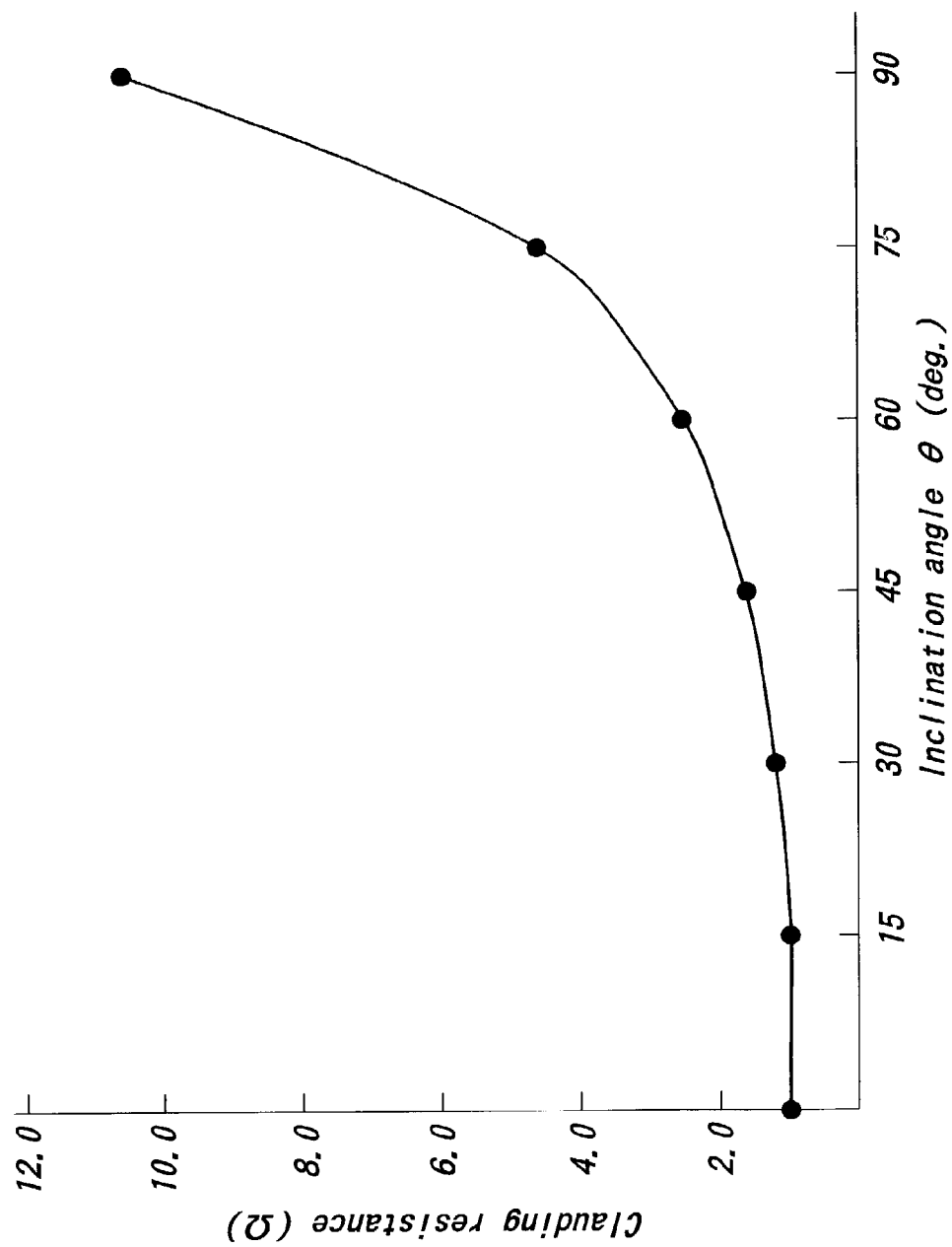
FIG. 9 is a graph showing the relation between the inclination angle θ of the inclined portions of the elongated portions of the electrode films and the crowding resistance (Ω)

FIG. 9 is a graph showing the relation between the inclination angle θ of the inclined portions of the elongated portions of the electrode films and the crowding resistance (Ω) under the following condition.

Resistance of magnetoresistive effective film 300: 30.8Ω
Depth H1 of magnetoresistive effective film 300: 0.2 μm
Sense current Is: 5 mA
Inclination angle θ: 45 degrees Electrode films: Au films having a thickness of 500 Å and a resistivity of 2×10−6(Ωcm)

As is apparent from FIG. 9, the crowding resistance (Ω) can be maintained small to be 2Ω or below within a range of the inclination angle θ of 60 degrees or below. Also, the change ratio of the crowding resistance (Ω) with the inclination angle θ can be maintained small. In contrast, the crowding resistance (Ω) is remarkably increased within a range of the inclination angle θ of not less than 60 degrees. As a result, the inclination angle θ is preferably set to 60 degrees or below.

It is desired that the relation of (H2/H1)≧2 is satisfied, provided that the depth of the magnetoresistive effective film 300 is denoted by H1 and the depth of the side edge portions 350 and 360 of the elongated portions 351 and 361 is denoted by H2.

Figure 10:
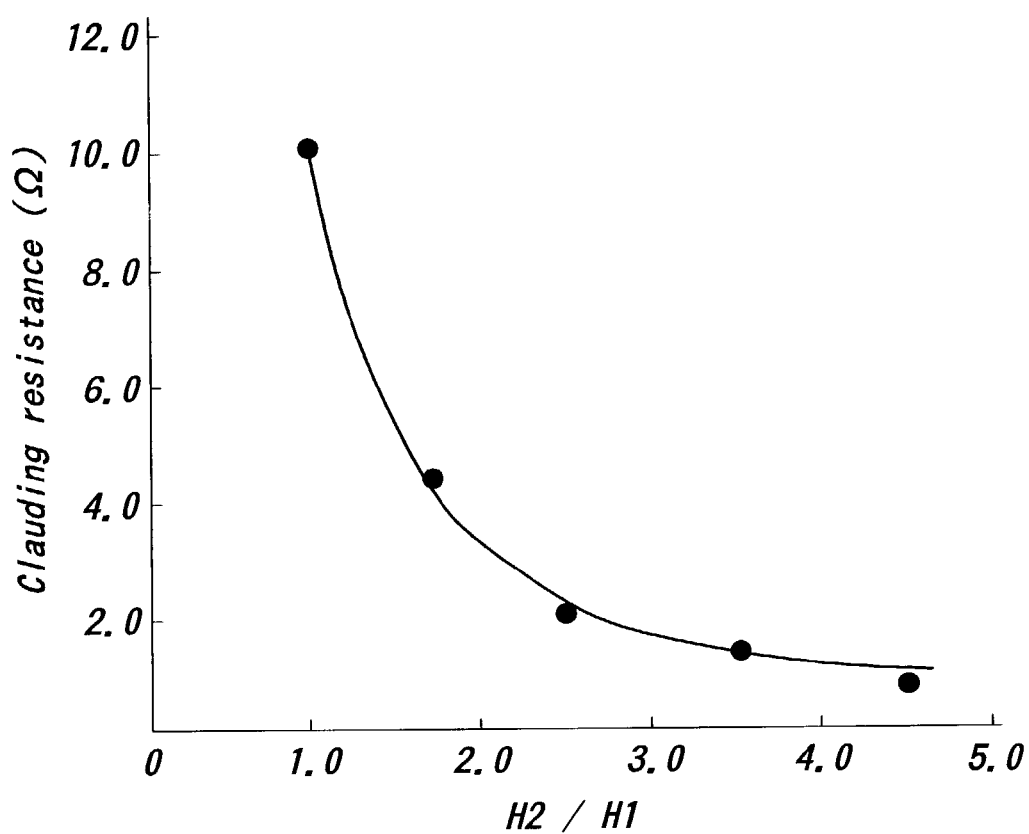
FIG. 10 is a graph showing the relation between the ratio of the depth H2 of the side edge portions of the elongated portions of the electrode films to the depth H1 of the magnetoresistive effective film and the crowding resistance (Ω)

FIG. 10 is a graph showing the relation between the (H2/H1) ratio and the crowding resistance (Ω) under the following condition.

Resistance of magnetoresistive effective film 300: 31Ω
Depth H1 of magnetoresistive effective film 300: 0.2 μm
Sense current Is: 5 mA
Inclination angle θ: 45 degrees
Electrode films: Au films having a thickness of 500 Å and a resistivity of 2×10−6(Ωcm)
Also, the depth H1 is maintained constant and the depth H2 is varied.

As is apparent from FIG. 10, the crowding resistance (Ω) can be maintained 4Ω or below if the (H2/H1) ratio ≧2 is satisfied. In contrast, the claunding resistance is remarkably increased if the relation of (H2/H1) ratio <2 is satisfied. Therefore, it is desired that the (H2/H1) ratio ≧2 is satisfied.

Figure 11:
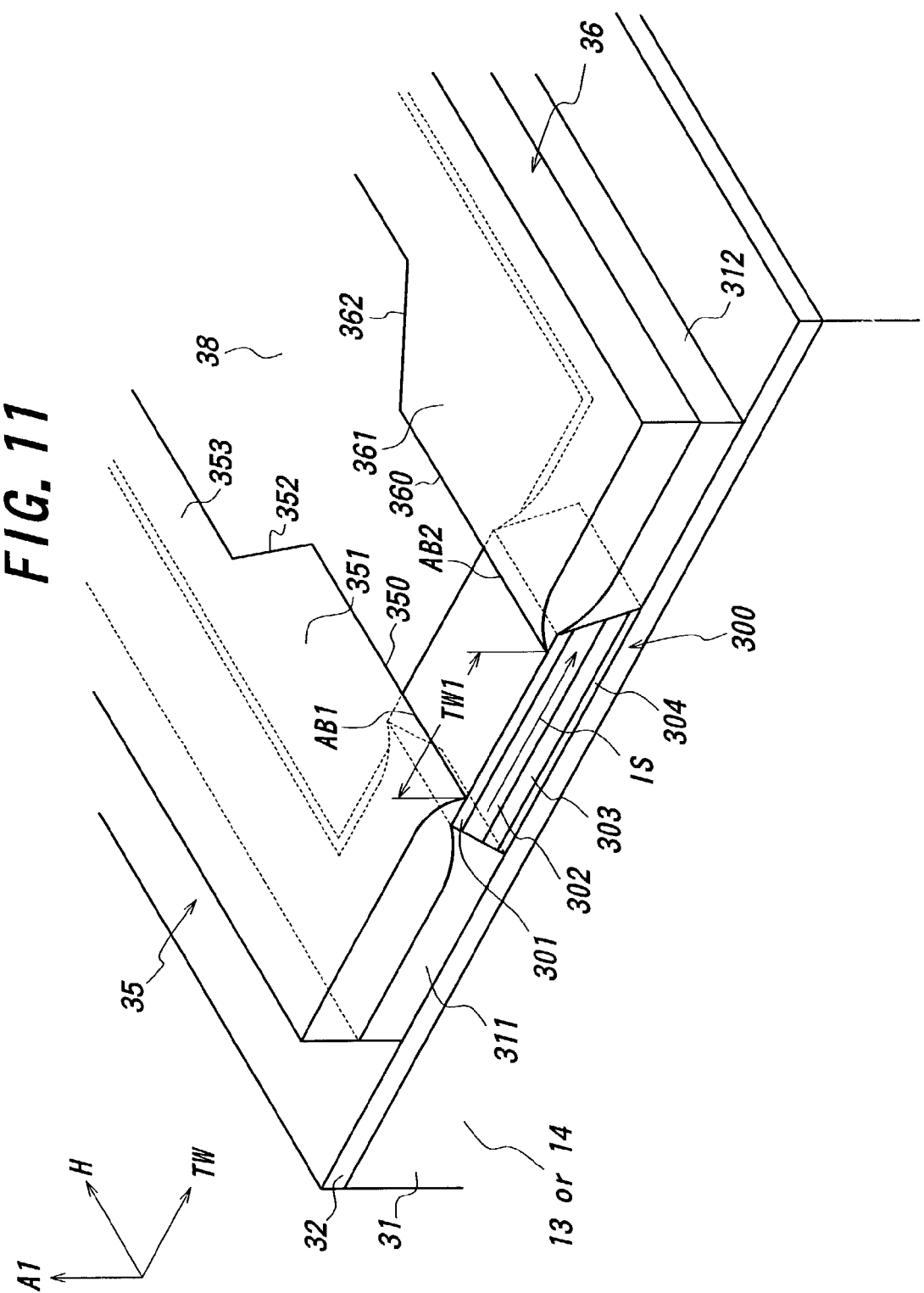
FIG. 11 is a perspective view showing another reading element of a thin film magnetic head according to the present invention.

FIG. 11 is a perspective view showing another reading element of a thin film magnetic head according to the present invention. In FIG. 11, like reference numerals are imparted to like constituent elements. In this embodiment, the forefronts of the electrode films 35 and 36 are overlaid on the magnetoresistive effective film 300 by a given overlaying degree to form a lead overlaying structure. In this embodiment, too, the above-mentioned effect/operation can be exhibited.

Figure 12:
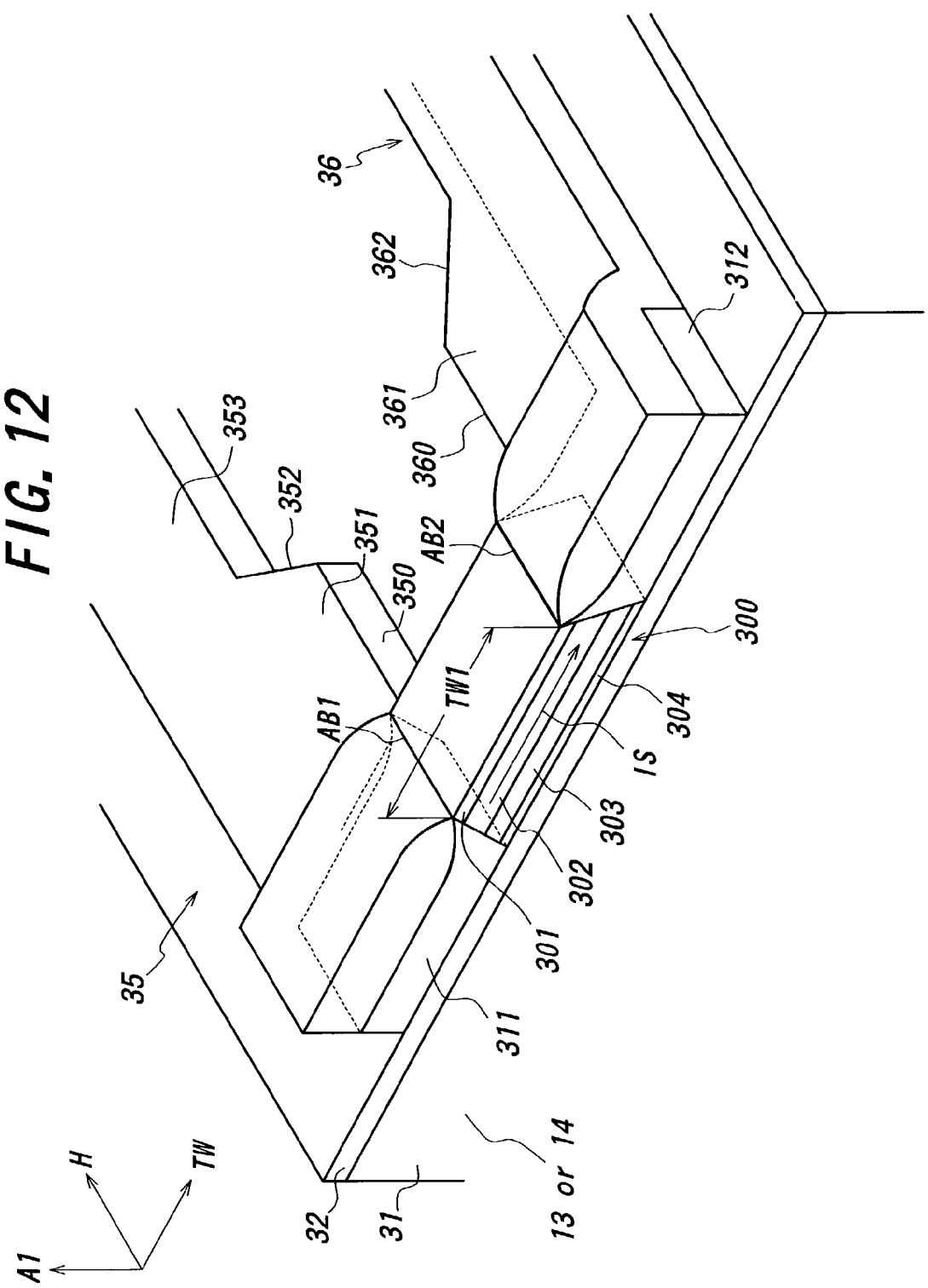
FIG. 12 is a perspective view showing still another reading element of a thin film magnetic head according to the present invention.

FIG. 12 is a perspective view showing still another reading element of a thin film magnetic head according to the present invention. In FIG. 12, like reference numerals are imparted to like constituent elements. In this embodiment, the planarizing film is not formed, and the other constituent elements are formed in the same manner as the embodiment described with reference to FIGS. 3–5.

In this embodiment, too, Barkhausen noise can be repressed effectively and thus, the crowding resistance can be also repressed sufficiently.

Figure 13:
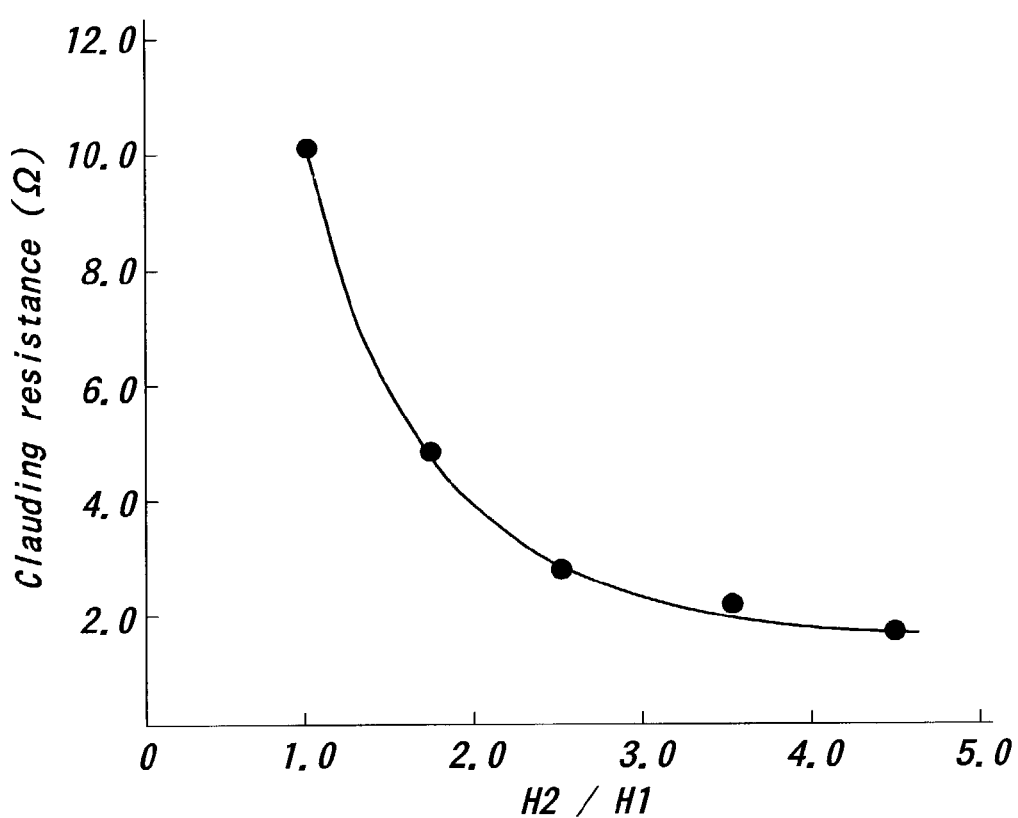
FIG. 13 is a graph showing the relation between the ratio of the depth H2 of the side edge portions of the elongated portions of the electrode films to the depth H1 of the magnetoresistive effective film and the crowding resistance (Ω) in the reading element illustrated in FIG. 12.

FIG. 13 is a graph showing the relation between the (H2/H1) ratio and the crowding resistance (Ω) in this embodiment under the following condition.

Resistance of magnetoresistive effective film 300: 31Ω
Depth H1 of magnetoresistive effective film 300: 0.2 μm
Sense current Is: 5 mA
Inclination angle θ: 45 degrees
Electrode films: Au films having a thickness of 500 Å and a resistivity of 2×10−6(Ωcm)
Also, the depth H1 is maintained constant and the depth H2 is varied.

As is apparent from FIG. 13, the crowding resistance (Ω) can be maintained 4Ω or below if the (H2/H1) ratio ≧2 is satisfied. In contrast, the claunding resistance is remarkably increased if the relation of (H2/H1) ratio <2 is satisfied. Therefore, it is desired that the (H2/H1) ratio ≧2 is satisfied.

Figure 14:
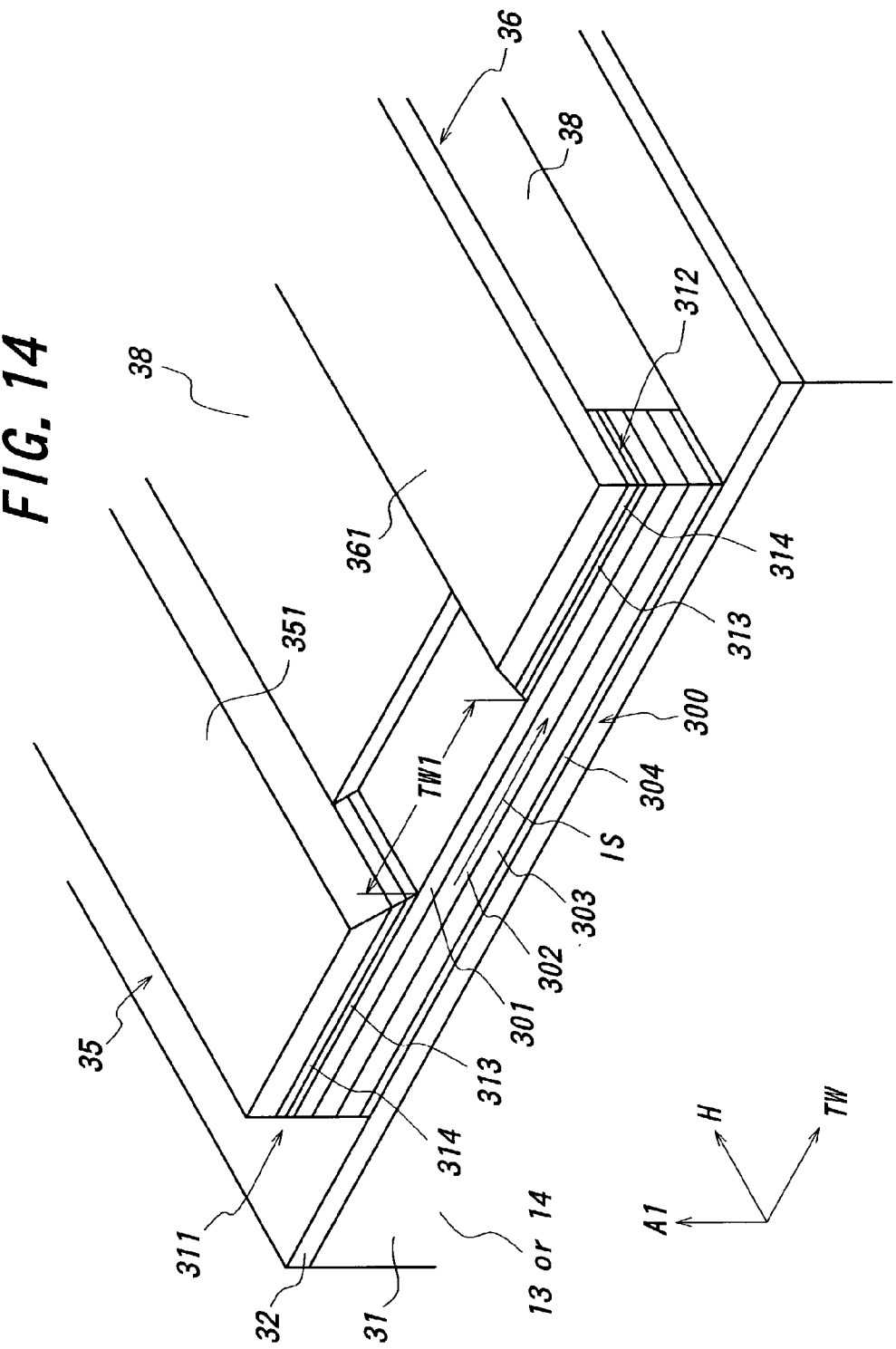
FIG. 14 is a perspective view showing a further reading element of a thin film magnetic head according to the present invention.
Figure 15:
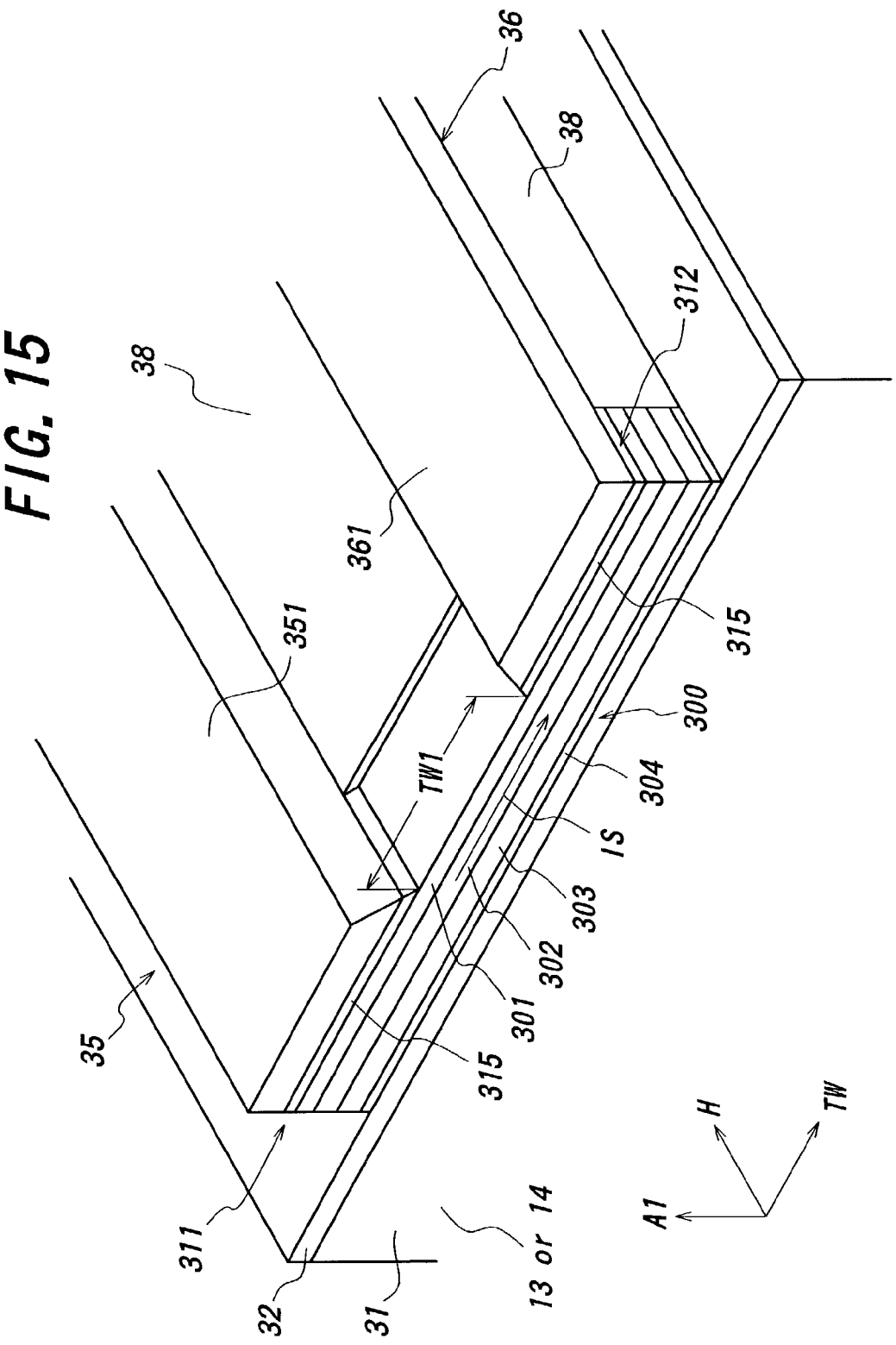
FIG. 15 is a perspective view showing a still further reading element of a thin film magnetic head according to the present invention.
Figure 16:
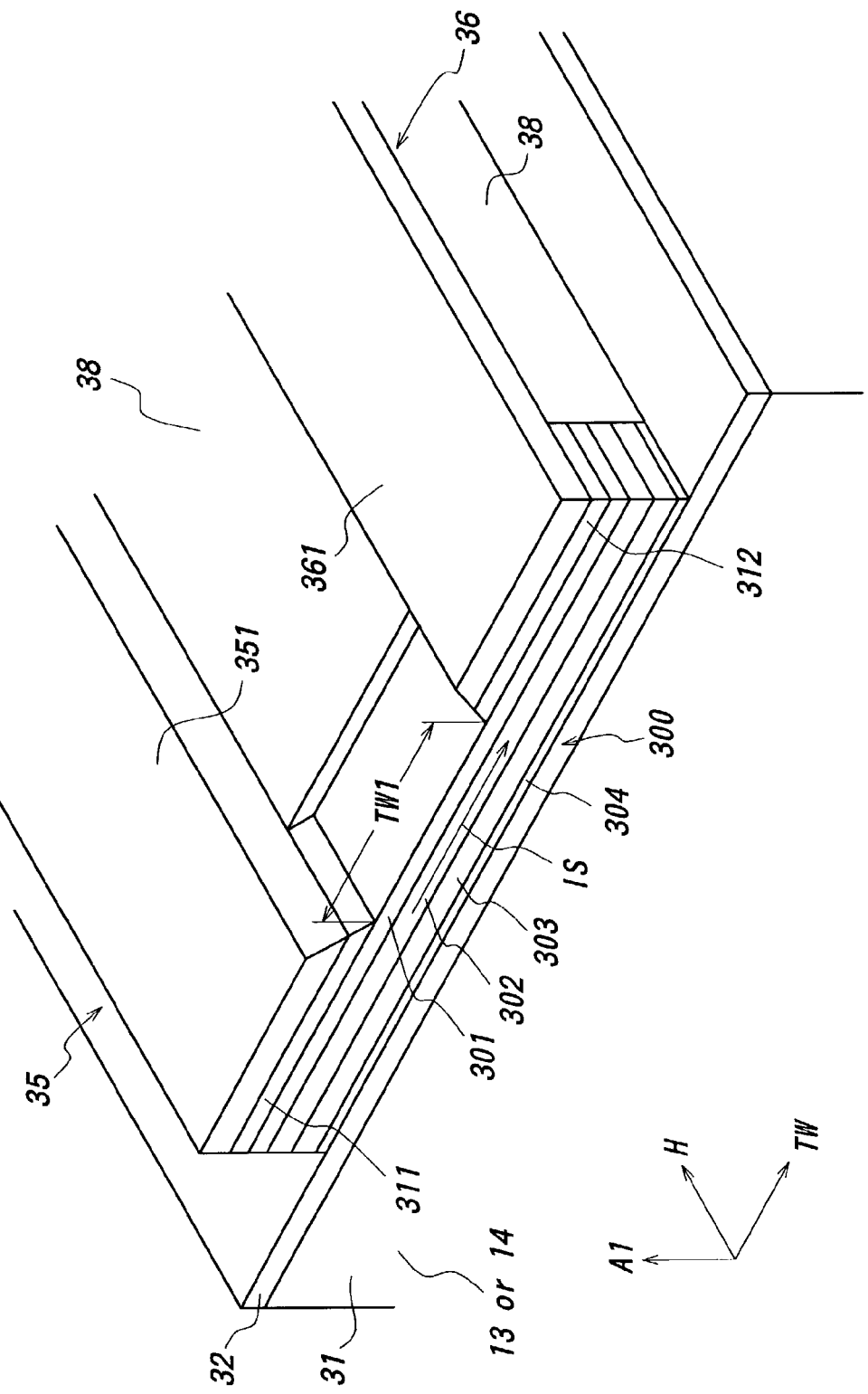
FIG. 16 is a perspective view showing a reading element of a thin film magnetic head according to the present invention.

FIGS. 14–16 are perspective views showing other reading elements to be employed in a thin film magnetic head according to the present invention. In these figures, like reference numerals are imparted to like constituent elements, and explanation for like constituent elements is omitted.

In the embodiment relating to FIG. 14, the magnetic domain-controlling films 311 and 312 include ferromagnetic films 313 and antiferromagnetic films 314, respectively, and generate an exchange biasing magnetic field through the bonding with exchange interaction between the ferromagnetic films 313 and the antiferromagnetic films 314. The ferromagnetic films 313 are provided so as to be adjacent to the first ferromagnetic layer 301 of the magnetoresistive effective film 300, and a given exchange biasing magnetic field as a perpendicular biasing magnetic field is applied to the first ferromagnetic layer 301 through the bonding with exchange interaction of the ferromagnetic films 313 and the antiferromagnetic films 314.

In the embodiment relating to FIG. 15, the magnetic domain-controlling films 311 and 312 include antiferromagnetic films 315 which is bonded to the first ferromagnetic film 301 of the magnetoresistive effective film 300 through the bonding with exchange interaction. In this case, a given exchange biasing magnetic field as a perpendicular biasing magnetic field is applied to the first ferromagnetic layer 301 through the bonding with exchange interaction between the layer 301 and the film 315.

In the embodiment relating to FIG. 16, the magnetic domain-controlling films 311 and 312 are made of hard magnetic films, relatively, and formed directly on the ferromagnetic film 301 of the magnetoresistive effective film 300.

The structural characteristics shown in FIGS. 1–8 can be applied for the embodiments shown in FIGS. 14–16 if employed without disadvantage, and then, relations as shown in FIGS. 9 and 10 can be exhibited, but detailed description is omitted.

Figure 17:
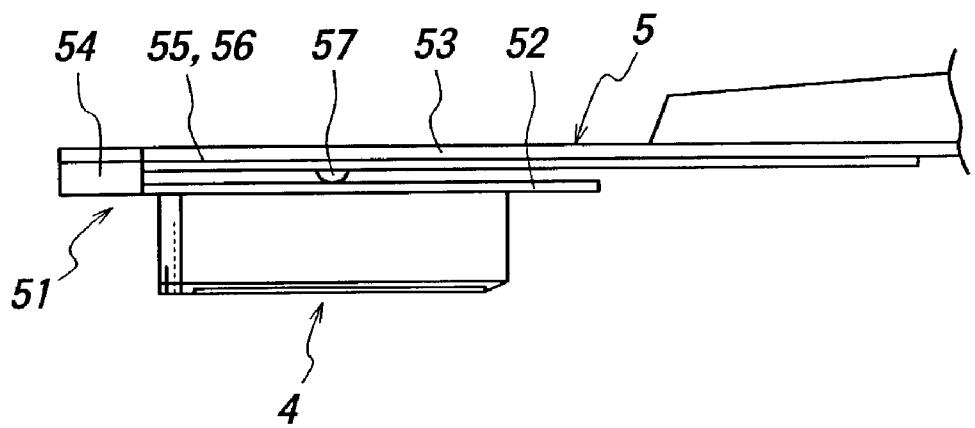
FIG. 17 is an elevational view showing a portion of a magnetic head device according to the present invention.
Figure 18:
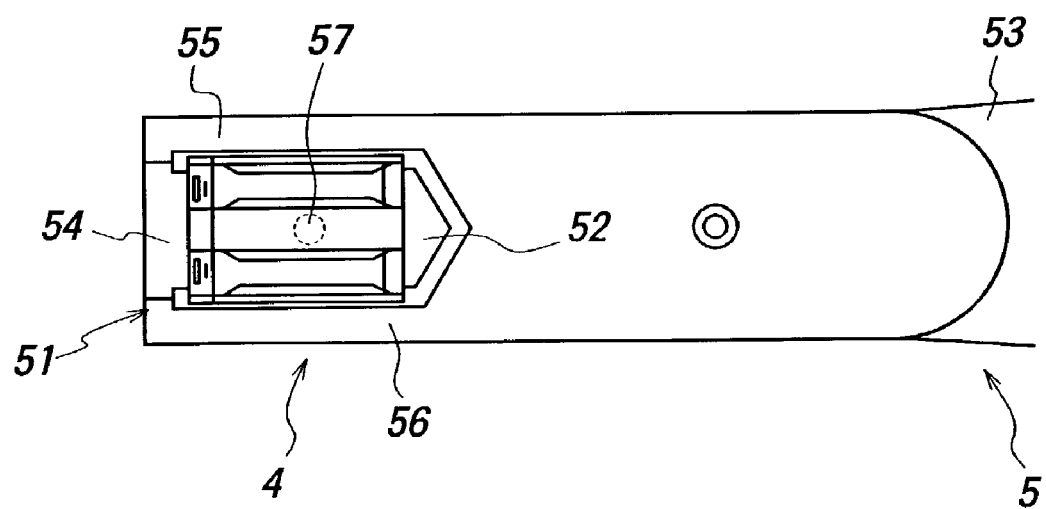
FIG. 18 is a bottom view showing the magnetic head device illustrated in FIG. 17.

FIG. 17 is an elevational view showing a portion of a magnetic head device according to the present invention, and FIG. 18 is a bottom view showing the magnetic head device illustrated in FIG. 17. The illustrated magnetic head device includes a thin film magnetic head 4 as shown in FIGS. 1–16 according to the present invention and a head supporting device 5.

The head supporting device 5 supports the thin film magnetic head 4 at the under surface of a flexible member 51 made of a metallic plate which is attached on the free edge thereof in the long direction of a supporting member 53 made of a metallic plate.

The flexible member 51 has two outer frames 55 and 56 extending along the long direction of the supporting member 53, a side frame 54 to join the outer frames 55 and 56 at the edge thereof, and a tongue-shaped member 52, of which one end is a free edge, extending along the outer frames 55 and 56 from the center of the side frame.

On the center of the tongue-shaped member 52 is positioned a hemispherical loading protrusion 57, bulging on the supporting member 53, to apply load to the tongue-shaped member 52.

The thin film magnetic head 4 is attached on the under surface of the tongue-shaped member 52 so that it can have its air outflow edge along the side frame 54. In the present invention, the head supporting device 5 is not limited to the above embodiment.

Figure 19:
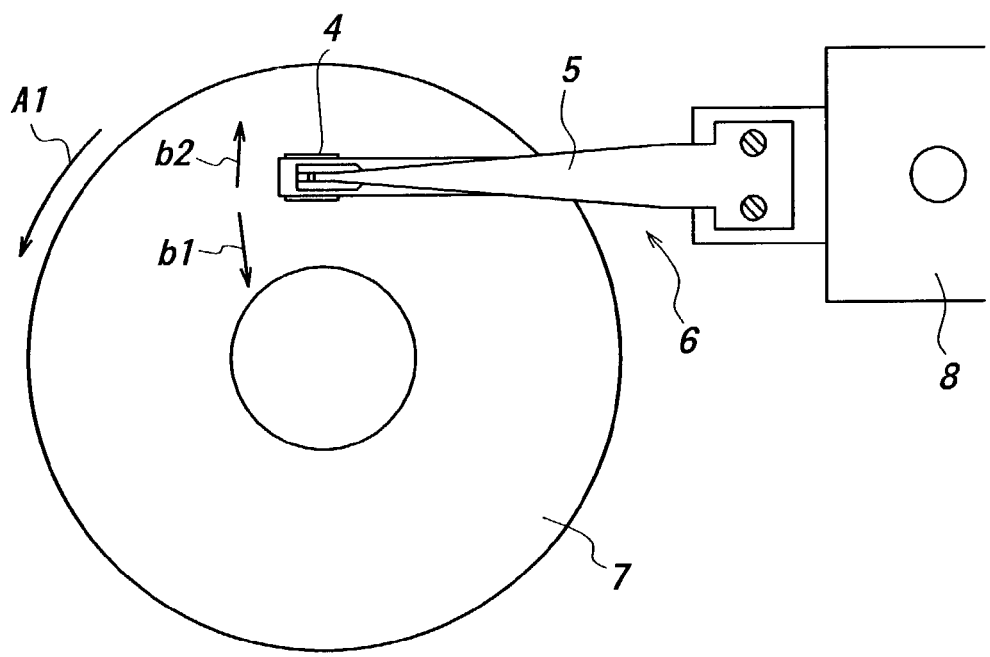
FIG. 19 is a plan view showing a magnetic recording/reproducing drive device according to the present invention.

FIG. 19 is a plan view showing a magnetic recording/reproducing drive device according to the present invention.

A magnetic recording/reproducing drive device depicted in FIG. 19 includes a magnetic head device 6 as shown in FIGS. 17 and 18 and a magnetic disk 7. The magnetic head device 6 is driven by a position determining device 8 which supports one end of the device 5. The thin film magnetic head 4 of the magnetic head device 5 is supported by the head supporting device 5 so that it can face the magnetic recording surface of the magnetic disk 7.

When the magnetic disk 7 is rotated in the A1 direction by a driving device (not shown), the thin film magnetic head 4 is floated from on the magnetic disk 7 by a minute distance. In this case, rotary-actuator driving system is normally employed as a driving mechanism, but linear-actuator driving system may be employed. In this embodiment, the rotary-actuator driving system is employed, and then, the thin film magnetic head 4 attached to the free edge of the head supporting device 5 is driven in the radial direction b1 or b2 of the magnetic disk 7 and positioned on a given track by the position determining device 8.

Although the present invention was described in detail with reference to the above examples, this invention is not limited to the above disclosure and every kind of variation and modification may be made without departing from the scope of the present invention.

According to the present invention, as mentioned above, a thin film magnetic head, a magnetic head device and a magnetic recording/reproducing drive device which can exhibit large S/N ratio even though the depth dimension is reduced with the high density recording and the reduction of the track width can be provided.

What is claimed is:

1. A thin film magnetic head comprising a reading element including a magnetoresistive effective film, a pair of magnetic domain-controlling films and a pair of electrode films, said magnetoresistive effective film responding commensurate with an external magnetic field, said magnetic domain-controlling films being provided on both sides of said magnetoresistive effective film in a track width direction, respectively, so that the depth of said magnetic domain-controlling films is set equal to the depth of said magnetoresistive effective film in a depth direction perpendicular to said track width direction, said electrode films being provided on said magnetic domain-controlling films so as to have elongated portions, respectively, beyond a region where the depth of said magnetic domain-controlling films is set equal to the depth of said magnetoresistive effective film, wherein said elongated portions of said electrode films include inclined portions inclined outward from ends of side edge portions of said elongated portions, respectively; and wherein the relation of $(H2/H1) \geq 2$ is satisfied, provided that the depth of said magnetoresistive effective film is denoted by H1 and a depth of the side edge portions of said elongated portions is denoted by H2.

2. A thin film magnetic head as defined in claim 1, having a track width of 0.5 μm or below.

3. A thin film magnetic head as defined in claim 1, wherein said side edge portions are adjacent to both edges of said magnetoresistive effective film in said track width direction and are elongated backward from said magnetoresistive effective film in a depth direction.

4. A thin film magnetic head as defined in claim 1, wherein an inclination angle of said inclined portions is set to 60 degrees or below.

5. A thin film magnetic head as defined in claim 1, wherein said reading element further includes a planarizing film and said elongated portions of said electrode films are located on said planarizing film.

6. A thin film magnetic head as defined in claim 1, further comprising a slider to support said reading element.

7. A thin film magnetic head as defined in claim 1, further comprising a writing element made of an inductive type magnetic conversion element.

8. A thin film magnetic head as defined in claim 1, wherein said magnetoresistive effective film is made of a spin-valve film or a ferromagnetic tunnel junction film.

9. A magnetic head device comprising a thin film magnetic head as defined in claim 1 and a head supporting device to support said thin film magnetic head.

10. A magnetic recording/reproducing drive device comprising a magnetic head device as defined in claim 9 and a magnetic disk to be magnetically recorded and reproduced with said magnetic head device.

* * * * *